United States Patent
Liu et al.

(10) Patent No.: US 12,091,343 B2
(45) Date of Patent: Sep. 17, 2024

(54) WATER PURIFICATION USING POROUS CARBON ELECTRODE

(71) Applicant: California Institute of Technology, Pasadena, CA (US)

(72) Inventors: Kai Liu, Pasadena, CA (US); Michael R Hoffmann, South Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 58 days.

(21) Appl. No.: 15/892,923

(22) Filed: Feb. 9, 2018

(65) Prior Publication Data

US 2018/0222781 A1 Aug. 9, 2018

Related U.S. Application Data

(60) Provisional application No. 62/456,860, filed on Feb. 9, 2017.

(51) Int. Cl.
*C02F 1/461* (2023.01)
*C02F 1/28* (2023.01)
(Continued)

(52) U.S. Cl.
CPC ............ *C02F 9/00* (2013.01); *C02F 1/46109* (2013.01); *C02F 1/4672* (2013.01); *C02F 1/722* (2013.01);
(Continued)

(58) Field of Classification Search
CPC .......... C02F 9/00; C02F 1/722; C02F 1/4672; C02F 1/46109; C02F 1/4691;
(Continued)

(56) References Cited

U.S. PATENT DOCUMENTS 3,793,173 A * 2/1974 Kawahata ........... C02F 1/46109
205/756
5,932,185 A 8/1999 Pekala et al.
(Continued)

FOREIGN PATENT DOCUMENTS

JP H11267651 A 10/1999

OTHER PUBLICATIONS

Sudan et al., Electrolytic Synthesis of Peroxyacetic Acid Using In Situ Generated Hydrogen Peroxide on Gas Diffusion Electrodes, Journal of Electrochemical Society, 151 (9) D93-D97, Nov. 5, 2003. (Year: 2003).*
(Continued)

*Primary Examiner* — Christian Roldan
(74) *Attorney, Agent, or Firm* — Gavrilovich, Dodd & Lindsey LLP

(57) ABSTRACT

A water purification electrode composed of a porous carbon material is disclosed. The electrode may be used as a flow-through cathode in an electro-peroxone process providing high $H_2O_2$ production activity for electrochemical wastewater treatment. The porous carbon material is a binding agent-free carbon structure that enables $H_2O_2$ to be electro-generated in situ at cathode. The porous carbon material may be synthesized from resorcinol and can provide a relatively large reaction surface area of 200-800 $m^2/g$. The porous carbon material also achieves low energy consumption as well as a wide pH working range, making it suitable for treating many types of organic, inorganic, and biological contaminants in water. The electrode may be integrated with an anode, ozone generator, and other components into a compact, integrated water purification system.

17 Claims, 12 Drawing Sheets

(51) Int. Cl.
| | |
|---|---|
| C02F 1/44 | (2023.01) |
| C02F 1/467 | (2023.01) |
| C02F 1/469 | (2023.01) |
| C02F 1/72 | (2023.01) |
| C02F 9/00 | (2023.01) |
| C02F 101/30 | (2006.01) |
| C02F 1/78 | (2023.01) |
| C02F 101/36 | (2006.01) |
| C02F 101/38 | (2006.01) |
| C02F 103/08 | (2006.01) |
| C02F 103/34 | (2006.01) |

(52) U.S. Cl.
CPC .............. C02F 1/283 (2013.01); C02F 1/444 (2013.01); C02F 2001/46133 (2013.01); C02F 2001/46161 (2013.01); C02F 1/4691 (2013.01); C02F 1/78 (2013.01); C02F 2101/301 (2013.01); C02F 2101/306 (2013.01); C02F 2101/363 (2013.01); C02F 2101/38 (2013.01); C02F 2103/08 (2013.01); C02F 2103/343 (2013.01); C02F 2103/346 (2013.01); C02F 2201/46125 (2013.01); C02F 2201/46165 (2013.01); C02F 2201/4619 (2013.01); C02F 2201/782 (2013.01); C02F 2209/006 (2013.01); C02F 2209/008 (2013.01); C02F 2209/40 (2013.01); C02F 2303/04 (2013.01); C02F 2303/16 (2013.01); C02F 2305/023 (2013.01); Y02W 10/37 (2015.05)

(58) Field of Classification Search
CPC ...... C02F 2201/46165; C02F 2209/006; C02F 2201/46125; C02F 2209/40; C02F 2209/008; C02F 2103/08; C02F 2303/16; C02F 1/444; C02F 2201/4619; C02F 2101/306; C02F 2001/46133; C02F 1/78; C02F 1/283; C02F 2305/023; C02F 2201/782; C02F 2101/38; C02F 2101/301; C02F 2103/346; C02F 2103/343; C02F 2101/363; C02F 2303/04; C02F 2001/46161; Y02W 10/37
USPC ......................................................... 429/505
See application file for complete search history.

(56) References Cited

U.S. PATENT DOCUMENTS

| | | | | |
|---|---|---|---|---|
| 6,096,179 | A | 8/2000 | Fajt et al. | |
| 6,309,532 | B1* | 10/2001 | Tran | B01J 47/08 204/267 |
| 7,754,064 | B2* | 7/2010 | Buschmann | C25B 1/30 205/466 |
| 2003/0070940 | A1* | 4/2003 | Hirayama | C02F 1/4674 205/746 |
| 2005/0131266 | A1* | 6/2005 | Carman | B09B 3/0075 422/186.07 |
| 2008/0314807 | A1* | 12/2008 | Junghanns | B01D 61/025 210/85 |
| 2009/0071903 | A1* | 3/2009 | Nakatsuji | B01D 69/12 210/650 |
| 2009/0107842 | A1* | 4/2009 | Park | D01D 5/0038 204/554 |
| 2009/0212262 | A1* | 8/2009 | Elson | C02F 1/4691 252/500 |
| 2009/0258213 | A1 | 10/2009 | Chmelka et al. | |
| 2010/0092830 | A1* | 4/2010 | Hayashi | H01M 4/90 429/481 |
| 2013/0183511 | A1* | 7/2013 | Dai | B82Y 30/00 428/220 |
| 2013/0280601 | A1 | 10/2013 | Geramita et al. | |
| 2015/0041708 | A1* | 2/2015 | Wiesner | H01G 11/34 252/182.1 |
| 2015/0306570 | A1* | 10/2015 | Mayes | H01G 11/24 424/125 |
| 2015/0340172 | A1* | 11/2015 | Kang | H01G 11/30 252/503 |
| 2018/0170774 | A1* | 6/2018 | Xia | C02F 1/4674 |
| 2020/0262723 | A1* | 8/2020 | Wang | C02F 1/727 |

OTHER PUBLICATIONS

Porada et al., Review on the science and technology of water desalination by capacitive deionization, Progress in Material Science 58 (2013) 1388-1442, Elsevier (Year: 2013).*

Wickramaratne et al., Nitrogen Enriched Porous Carbon Spheres: Attractive Materials for Supercapacitor Electrodes and CO2 Adsorption, Chemistry of Materials, ACS Publications, Chem. Mater., Apr. 2014, 26, pp. 2820-2828. (Year: 2014).*

Dong et al., Basic Amid Acid-Assisted Synthesis of Resorcinol-Formaldehyde Polymer and Carbon Nanospheres, Ind. Eng. Chem. Res., 2008, 47, pp. 4712-4716 (Year: 2008).*

Turkay et al., Review—The Application of an Electro-Peroxone Process in Water and Wastewater Treatment, Journal of the Electrochemical Society (ECS), 164(6), pp. E94-E102 (2017). (Year: 2017).*

Wang et al., Organic Amine-Mediated Synthesis of Polymer and Carbon Microspheres: Mechanism Insight and Energy-Related Applications, ACS, Applied Material & Interfaces, 2016, 8, pp. 4851-4861. (Year: 2016).*

Thomas, Shane, International Search Report and Written Opinion, PCT/US18/17643, United States Patent and Trademark Office, Jun. 7, 2018.

Wittmann-Regis, Agnes; International Preliminary Report on Patentability and Written Opinion, PCT/US2018/017643, The International Bureau of WIPO, Aug. 13, 2019.

Bruno, M.M. et al., "Characterization of monolithic porous carbon prepared from resorcinol/formaldehyde gels with cationic surfactant", Colloids and Surfaces A: Physiochemical and Engineering Aspects, vol. 358, No. 1-3, Apr. 5, 2020, pp. 13-20.

Tamborini, L.H. et al., "Successful application of a commercial cationic surfactant mixture (benzalkonium chloride) as porosity stabilizer in porous carbons fabrication", Colloids and Surfaces A: Physiochemical and Engineering Aspects, vol. 509, Nov. 1, 2016, pp. 449-456.

Zsigmond, Zoltan, Extended European Search Report, European Patent Office, Application No. 18750721.5, Jul. 23, 2020.

Office Action, Application No. 201880009673.X, China Intellectual Property Administration, Oct. 20, 2021.

* cited by examiner

WATER PURIFICATION USING POROUS CARBON ELECTRODE

CROSS REFERENCE TO RELATED APPLICATIONS

This Application claims the benefit of U.S. Provisional Patent Application Ser. No. 62/456,860, filed on Feb. 9, 2017, which is incorporated by reference herein in its entirety.

TECHNICAL FIELD

The invention generally relates to water treatment, and more particularly, to water purification techniques that utilize electro-peroxone (e-peroxone) processes.

BACKGROUND

Different systems have been developed for the removal of pollutants from water. Examples of these systems include wastewater treatment systems that employ various methods, such as filtration, physical adsorption, and/or advanced oxidation processes (AOPs), to treat organic, inorganic, and biological contaminants in water, as well as desalination systems.

Filtration is a process whereby contaminants are physically removed by size exclusion. Known filtration processes include, for example, reverse osmosis and microfiltration. Drawbacks of filtration include clogging of the filter pores by contaminants, often resulting in fouling and frequent replacement of the filter. This may lead to high maintenance costs in some applications.

Physical adsorption involves transferring contaminants out of the aqueous medium and into an absorbent material. Granular activated carbon (GAC), powdered activated carbon (PAC), and biochar are known absorption materials used for water purification. Although these materials are capable of removing a wide range of contaminants, disposal and regeneration of the spent adsorbent can be problematic.

Advanced oxidation processes (AOPs) include a number of different techniques, including ozonation, electrochemical oxidation, photo oxidation, peroxone (ozone/hydrogen peroxide) processes, electrical peroxone (or electro-peroxone) processes, and the like. A drawback of these methods is the high cost of capital investment. For example, an electrode array used for electrochemical oxidation may cost over ten thousand dollars. Additionally, other drawbacks include oxidation processes that may be slow and energy intensive, and that are therefore often performed in batch reactors, by which purified effluent cannot be continuously discharged.

Peroxone processes generally involve adding hydrogen peroxide into a batch reactor from an external source, whereas electro-peroxone processes generally involve the generation of hydrogen peroxide using a bonded carbon graphite cathode inside the batch reactor. The use of a peroxone process may be impractical in some circumstances due to the high cost of hydrogen peroxide and the danger involved in its transportation. On the other hand, electro-peroxone processes may suffer from the rapid deterioration of the bonded carbon electrode due to the degradation of its binding agents (including perfluorinated binding agents) and the limited reactive area of carbon electrode, which may be reduced due to the filling of pore space inside the electrode by the binding agents.

Known water treatment systems that have employed combinations of the foregoing methods were often dedicated treatment facilities that were expensive and large with high maintenance costs.

Accordingly, it is desirable to provide a water treatment system and method that overcome at least some of the aforementioned drawbacks and limitations of known water purification techniques.

SUMMARY

An electrode is disclosed that may be used as a flow-through cathode in an electro-peroxone system providing vastly improved $H_2O_2$ production activity for electrochemical water treatment. The electrode includes a porous carbon material synthesized from resorcinol. The electrode may be relatively inexpensive to manufacture and may allow a compact, highly efficient electrochemical water purification system with reduced energy consumption, reduced maintenance, lower cost, and wide application. For example, the electrode may be used to remove pollutants from water and/or for desalination.

In accordance with an exemplary embodiment of the electrode, the porous carbon material is a binding agent-free carbon structure that enables $H_2O_2$ to be electro-generated in situ at electrode at a higher production rate. The electrode may be manufactured by dissolving resorcinol and a surfactant in a mixture of ethanol and water to form a solution. Base or acid is then added to the solution, and formaldehyde is added to the solution to form a solution mixture. The solution mixture is heated to produce a solidified material. The solidified material is dried, and pyrolysis is performed on the dried solidified material under a protective gas, resulting in the monolithic porous carbon material.

The electrode can be used in systems that purify water by placing it in direct physical contact with the water and applying a suitable voltage potential.

The disclosure also describes a water purification system including one or more electrodes comprising the porous carbon material synthesized from resorcinol.

The foregoing summary does not define the limits of the appended claims. Other aspects, embodiments, features, and advantages will be or will become apparent to one with skill in the art upon examination of the following figures and detailed description. It is intended that all such additional features, embodiments, aspects, and advantages be included within this description and be protected by the accompanying claims.

BRIEF DESCRIPTION OF THE FIGURES

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

Figure 1:
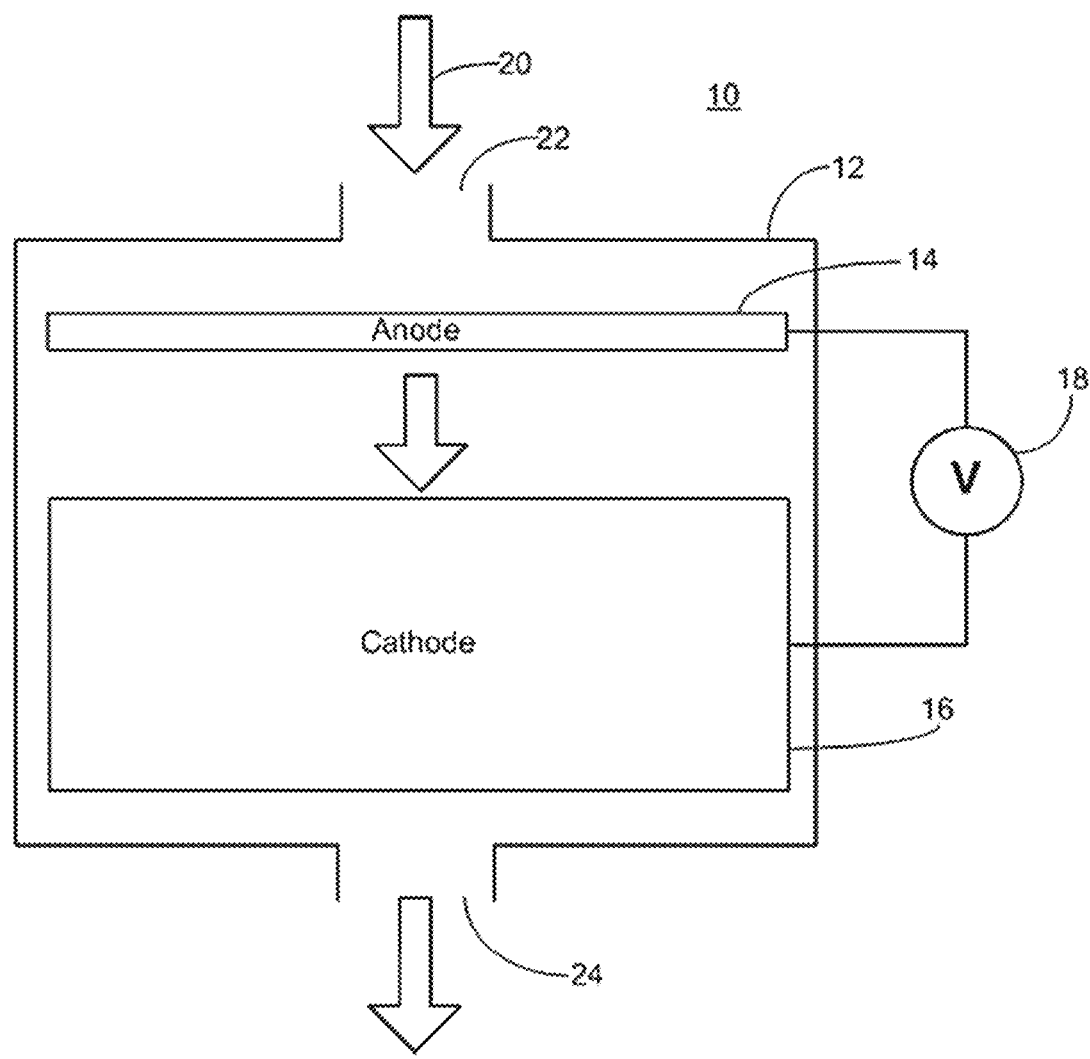
FIG. 1 illustrates an exemplary water purification system including an electrode having porous carbon material, such as a continuous water purification system.

The following detailed description, which references to and incorporates the drawings, describes and illustrates one or more examples of electrolysis electrodes, water treatment systems, and methods of using electrolysis electrodes and water treatment systems, and of manufacturing electrolysis electrodes. These examples, offered not to limit but only to exemplify and teach embodiments of inventive electrodes, methods, and systems, are shown and described in sufficient detail to enable those skilled in the art to practice what is claimed. Thus, where appropriate to avoid obscuring the invention, the description may omit certain information known to those of skill in the art. The disclosures herein are examples that should not be read to unduly limit the scope of any patent claims that may eventual be granted based on this application.

The word "exemplary" is used throughout this application to mean "serving as an example, instance, or illustration." Any system, method, device, technique, feature or the like described herein as "exemplary" is not necessarily to be construed as preferred or advantageous over other features.

As used in this specification and the appended claims, the singular forms "a," "an," and "the" include plural referents unless the content clearly dictates otherwise.

Although any methods and materials similar or equivalent to those described herein can be used in the practice or testing of the invention(s), specific examples of appropriate materials and methods are described herein.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

To provide efficient, continuous pollutant and/or contaminant removal in a cost-effective water purification process, embodiments of an inexpensive three-dimensional (3D) porous carbon electrode with large reactive surface area, large voidage, low tortuosity, and interconnected macropores are disclosed. The example electrodes can be applied in wastewater treatment systems as described herein.

As described herein, examples of a flow-through electro-peroxone water purification system, in which $H_2O_2$ may be electro-generated in situ by selective $O_2$ reduction in a porous carbon material (PCM), are disclosed for efficient continuous removal of one or more contaminants, which contaminants may include pharmaceuticals, biological matter, biocides such as herbicides, pesticides and fungicides, human or animal waste, pathogenic contaminants such as viruses, bacteria or parasites, chemical pollutants such as PCBs, TCEs, phthalates, or the like, semiconductor manufacturing wastewater which may contain contaminants such as perfluoroalkylsulfonate surfactants (PFAS), tetramethylammonium hydroxide (TMAH), and/or residual photopolymers, any combination of the foregoing, and the like.

High contaminant removal efficiency was achieved from the high $H_2O_2$ production rate (933-31,367 ppm/h/g) of an example PCM electrode at a wide range of pH (pH 4-10). The superior oxygen reduction performance of PCM was due to high proportion of defect and sp3-C, which are systematically introduced via kinetic control during synthesis of resorcinol formaldehyde polymeric precursor, as described herein.

FIG. 1 is a simplified illustration of an exemplary continuous water purification system 10 that includes a vessel 12 for holding an aqueous medium 20 such as wastewater, a first electrode (e.g., anode 14) and a second electrode (e.g., cathode 16) for use in water purification, and a voltage source 18 for providing current to the anode 14 and cathode 16. The system 10 can purify water having organic and/or inorganic matters by making use of one or more advanced oxidation processes (AOPs), such as an electro-peroxone process, to break contaminants, e.g. inorganic and/or organic matters, into small and stable molecules, such as water and $CO_2$. For the purposes of simplification, only a pair of electrodes 14, 16 are illustrated, although additional electrodes 14, 16 can be employed.

The system 10 illustrated in FIG. 1 includes an inlet 22 and an outlet 24. The system 10 can operate as a continuous reactor in that the aqueous medium 20 flows into the vessel through the inlet 22, passes through the anode 14 and cathode 16, and out of the reservoir through the outlet 24. Both the anode 14 and cathode 16 may be porous to allow a liquid medium to pass through them. Alternately, the system 10 can also be operated as a batch reactor, where the aqueous medium 20 does not continuously flow, but remains in the vessel 12 for a period of time in batches to be treated.

The water purification system 10 can be used to purify wastewater or other fluids. Wastewater may include organic or biological matters that are normally associated with waste products and/or inorganic or chemical matters that are associated with industrial or manufacturing processes.

Examples of the detailed construction of the cathode 16 are described herein with reference to the other Figures. Generally, the cathode 16 is composed of a porous carbon material (PCM) synthesized from resorcinol. The porous carbon material is a binding agent-free carbon structure that enables $H_2O_2$ to be electro-generated in situ at the cathode 16 at a significantly higher production rate. This structure improves the performance of the cathode 16 and the system 10 in electrochemical wastewater treatment applications by providing a significantly more porous cathode with a relatively large reactive surface area, large voidage, low tortuosity, and interconnected macropores suitable for wastewater treatment.

The anode 14 may be any suitable electrode for use in an electrochemical water treatment process. For example, the anode 14 may be a titanium plate, having holes formed therein suitable for passing the aqueous medium 20 at a desired rate of flow. The perforated titanium plate may be coated with $IrO_2$. Alternatively, the anode 14 may be a metal plate, such as stainless steel or the like, or it may be a PCM electrode.

The voltage source 18 may be any suitable means for supply current to the anode 14 and cathode 16, such as a power supply, solar cell, and/or battery. During operation of the water purification system 10, an anodic potential is applied by the source 18 between the anode 14 and the cathode 16 at a level that is sufficient to generate reactive species, e.g., hydrogen peroxide, at the cathode 16.

Figure 2:
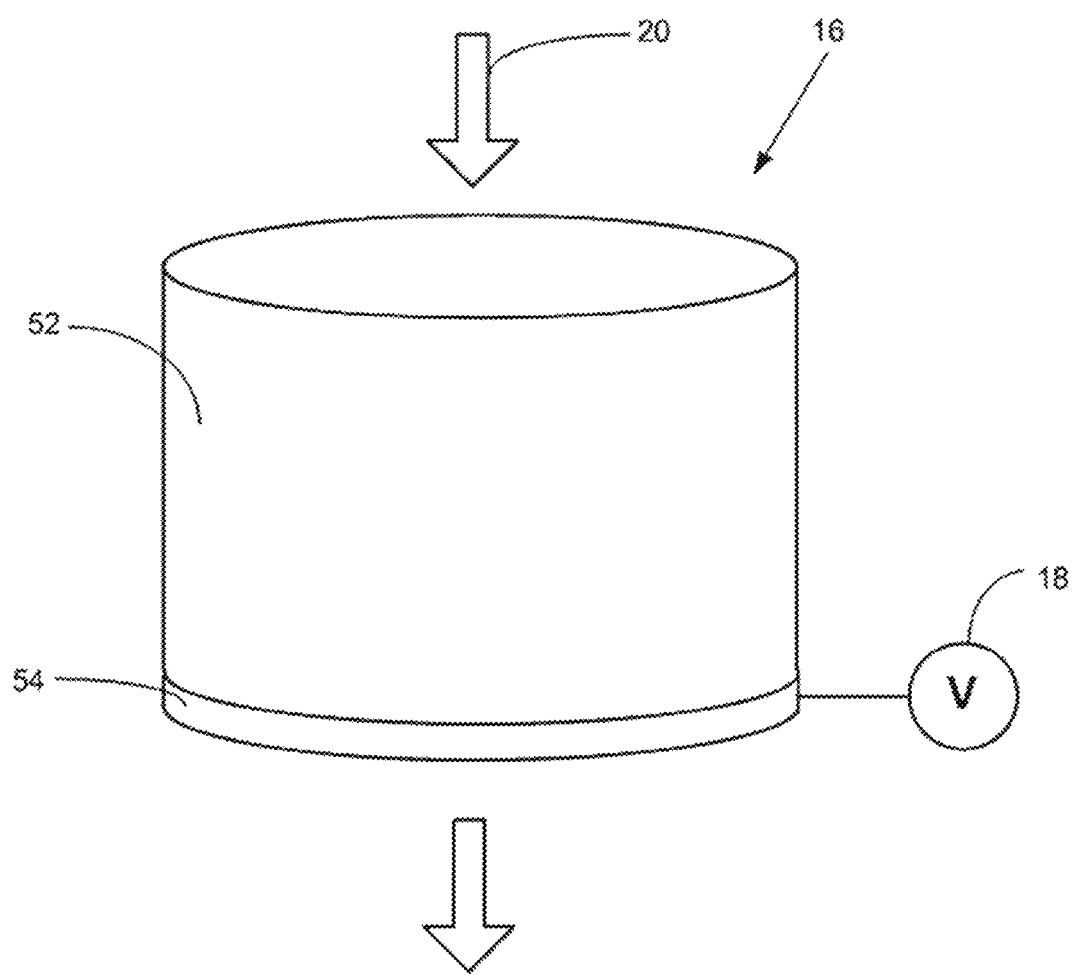
FIG. 2 is a schematic perspective view of an exemplary porous carbon electrode useable as a cathode in the system of FIG. 1.

FIG. 2 is a schematic perspective view of an example construction of the cathode 16. The cathode 16 includes a porous carbon material (PCM) 52 and a conductor 54 contacting the bottom surface of the porous carbon material 52. The aqueous medium 20 flows through the porous carbon material 52 and conductor 54 during electrochemical processing of the influent water. The voltage source 18 supplies current to the cathode 16 by way of the conductor 54. The PCM 52 may be derived from carbonizing resorcinol formaldehyde polymer, as described below. The carbonization of the polymer may result in an absence of impurities in the PCM 52, i.e., a graphitic PCM 52.

Figure 3:
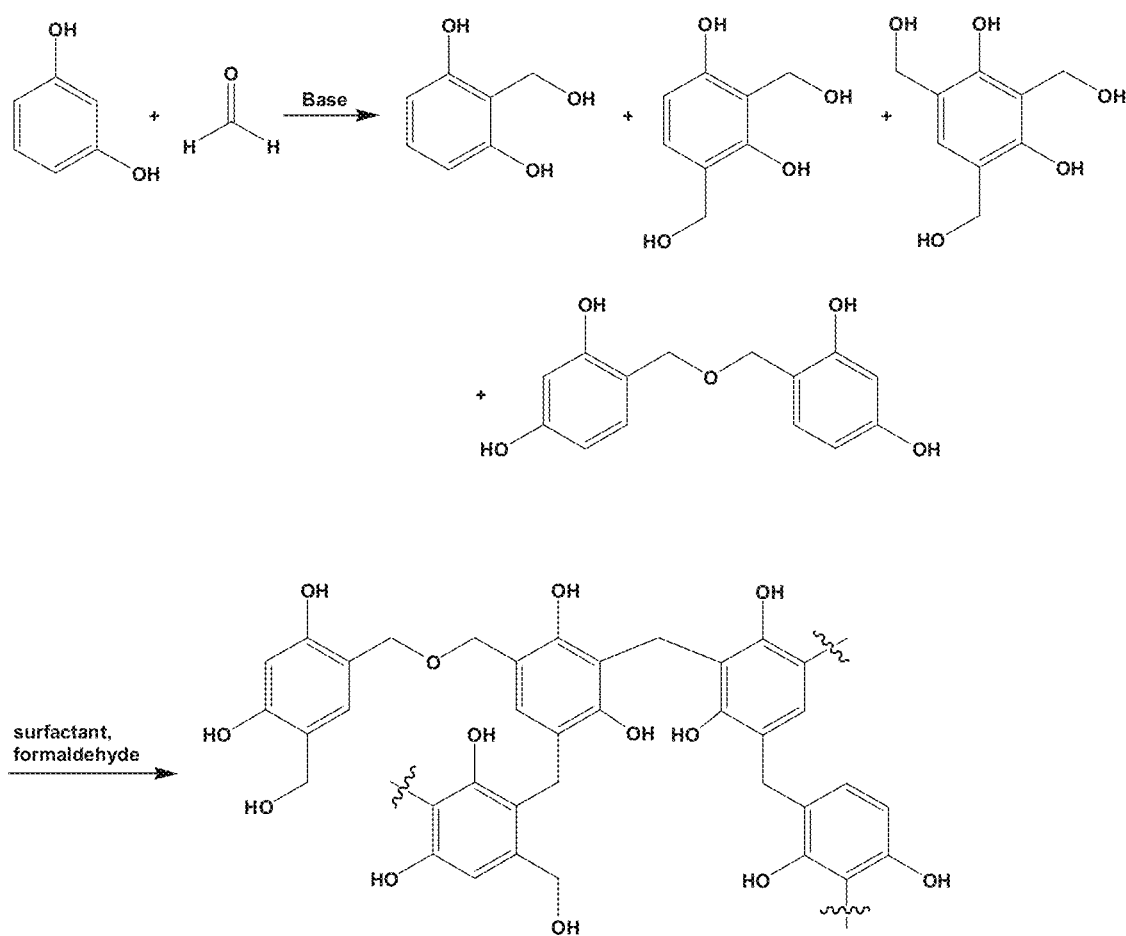
FIG. 3 illustrates the chemical reactions involved in an exemplary process of manufacturing porous carbon material included in a disclosed electrode.

FIG. 3 illustrates the chemical reactions involved in a general exemplary process of manufacturing the porous carbon material 52 included in a disclosed electrode. The chemical equations of FIG. 3 describe the polymerization reaction involved in the formation of the base catalyzed porous resorcinol-formaldehyde (RF) polymer that makes up the PCM 52.

The porous carbon material 52 of the cathode 16 may be synthesized by the following example process. First, resorcinol (e.g., 3.0 g, 27.3 mmol) and a surfactant, e.g., PLURONIC® F-127 (poloxamer 407) (e.g., 1.25 g) are dissolved in ethanol (e.g., 11.4 mL) and deionized water (e.g., 9 mL) inside a plastic centrifuge tube. Next, formaldehyde is added into the mixture, and a base (strong or weak base may be used) is also added. For example, the organic amine base 1,6-diaminohexane (e.g., 0.078 g, 0.67 mmol) may be added to the above solution and stirred for 30 minutes. Subsequently, formalin (e.g., 4.42 g, 54.5 mmol) may be added. The reaction mixture was stirred for an additional 30 minutes before being sealed and heated at 90° C. for four hours. To remove the ethanol and water used in the synthesis, the resultant polymer material, poly(benzoxazine-co-resol), is then dried at room temperature or 90° C. for 48 hours. Pyrolysis was performed at 800° C. for two hours under a nitrogen gas protection (another inert gas and/or hydrogen gas can be used instead). Any temperature above 600° C. will work, since graphitic carbon (conductive carbon) is formed above this temperature. Once the material is returned to the room temperature, it is removed from the furnace. The black porous carbon material, which may be crack-free, is obtained after cooling down to room temperature. It may be used in the cathode 16 without any additional modification.

Different porous carbon materials may be prepared by using different reaction kinetics and processes. Using different reaction kinetics and/or processes may cause the resulting carbon materials to having different structures and properties, such as different porosities, different reactive surface areas, pore sizes, voidages, tortuosity, and interconnected macropores. There is a correlation between the reaction kinetics and processes and porosity structure of the carbon material. Thus, the reactions used to form the porous carbon material may be altered to tune the degree of porosity and reactive species generation of the carbon material.

For example, adding relatively more surfactant to the synthesis process may result in larger pores. Using different strengths and types of bases may also tune the structure of the carbon material for use with different applications. Some water purification applications may require different pore sizes and carbon material structure. For instance, a carbon material with smaller pore may be desirable for drinking water purification applications, while a carbon material with larger pores may be desirable for purifying dirtier water.

Any acid/base can be used to catalyze the polymerization, where the reaction starts within minutes. Salt such as $Na_2CO_3$ can also catalyze the reaction. The polymer may form even when no acid/base is added, but at a much slower rate. Bases that may be used to catalyze the RF polymerization, include but are not limited to: KOH, NaOH, Triethylamine, Ethylenediamine, Hexamethylenediamine, Diethylenetriamine, and p-Phenylenediamine.

Five different example porous carbon materials were prepared using five different bases in the synthesis. In all five syntheses, 0.67 mmol of bases were used. The obtained porous carbon materials (PCMs) are denoted herein as PCM-X, where X indicates the identity of base used during synthesis. Four organic amines were used, including ethylenediamine (EDA), 1,6-Diaminohexane (DAH) (aka hexamethylenediamine (HDA)), trimethylamine (TMA), triethylamine (TEA). A non-amine base, KOH was also used.

Surfactants that may be used to create porosity inside the polymer, include but are not limited to: all fluorinated surfactants, e.g., FC4430; all silicone based surfactants, cationic surfactants, and anionic surfactants such as C10TAB, F-127 (CAS: 9003-11-6), SPAN80, and polyethylene glycol.

An advantage of the PCM 52 is the small footprint that it allows, which in turn reduces the physical size of a water purification system incorporating the PCM cathode 16. For example, the compactness of the PCM 52 allows multiple water purification systems to be carried by an individual person, and such systems may be conveniently connected to any existing installation or plumbing in extremely compact spaces. The compactness feature of the PCM cathode 16 is achieved by the relatively large reaction surface area of the porous carbon material 52, which may be between 200-800 $m^2/g$. Because the amount of reactive species produced by the PCM cathode 16 during electrochemical processing is directly related to the reactive surface area of the cathode, increasing the density of the reactive surface area of the PCM 52 decreases the physical size of the cathode 16. By comparison, conventional panel electrodes with similar magnitudes of reaction surface areas occupy hundreds times more space.

In addition, because an exemplary embodiment of the porous carbon material 52 does not include any binding agent, the reactive surface area is increased with a reduction in energy loss during operation.

The conductor 54 may be any suitable material for transferring electric current to the porous carbon material 52, and may act as an ohmic contact. For example, the conductor 54 may be thin sheet or foil of metallic conductor having holes or passages formed therein for allowing fluid to flow through the conductor 54. Alternatively, the conductor 54 can be a porous material such as a mesh or fabric. Suitable materials for the conductor 54 include valve metals, such as Ti.

Referring to FIG. 2, although the carbon material 52 and conductor 54 are illustrated as being cylindrical and round in shape, respectively, the cathode 16 may be constructed with any suitable 3D shape or size, for example, the carbon material 52 and conductor may be formed into a rectangular or square shape or the like.

The morphology of examples of the poly(benzoxazine-co-resol) derived PCM 52 was characterized by scanning electron microscopy (SEM). As shown in FIGS. 4a-d, the exemplary PCMs have high surface pore density with interconnected macropores and mesopores. The difference in pore structure indicates that pKa of the base can significantly affect the pore volume of meso- and/or macropores of the PCM 52.

Figure 4A:
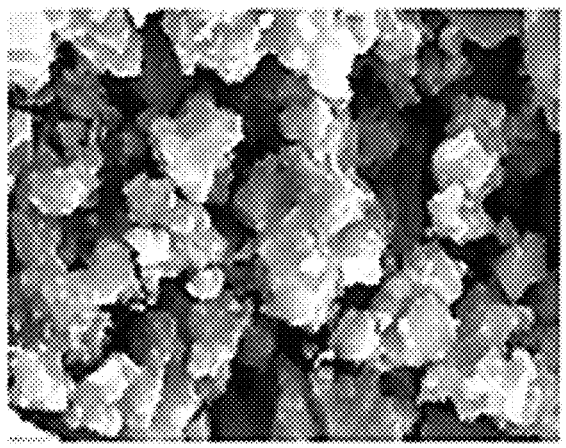
FIGS. 4a-d are scanning electron microscope images of examples of porous carbon materials.
Figure 4B:
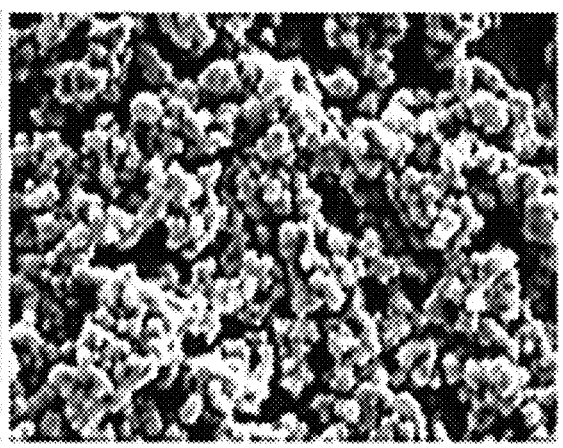
Figure 4C:
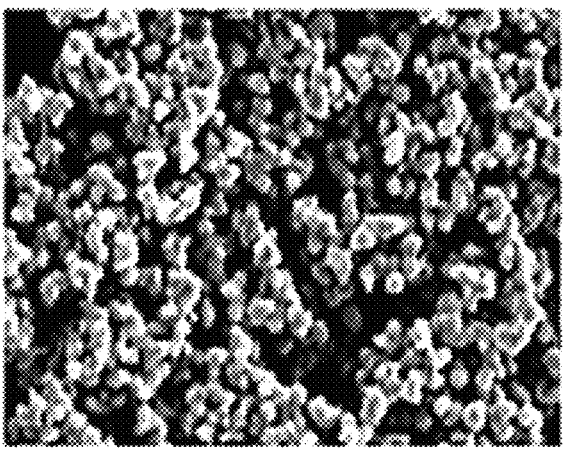
Figure 4D:
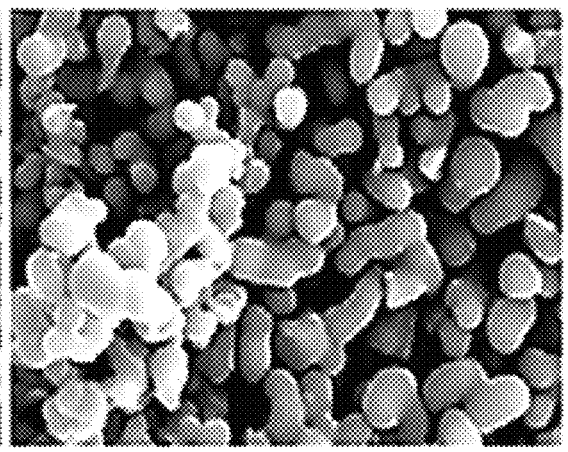

FIGS. 4a-d are scanning electron microscope (SEM) images of example porous carbon materials. FIG. 4a shows an image of the structure of a PCM prepared using hexamethylenediamine as the base in the polymer reaction. FIG. 4b shows an image of the structure of a PCM prepared using trimethylamine as the base in the polymer reaction. FIG. 4c shows an image of the structure of a PCM prepared using ethylenediamine as the base in the polymer reaction. FIG. 4d shows an image of the structure of a PCM prepared using potassium hydroxide as the base in the polymer reaction.

Comparing with the spherical porous structure formed by the other catalysts shown in FIGS. 4b-c, the PCM structure formed using hexamethylenediamine (FIG. 4a) has a more irregular porous structure, where increased defect sites enhance hydrogen peroxide production. The irregular porous structure of the PCM-HDA is retained after calcination at 800° C. with nitrogen protection during the manufacturing process.

At least some of pores of the PCM may have diameters of 1 μm or more, for example, 5 μm or more. PCMs having smaller pore sizes under 1 μm may also be manufactured.

Figure 5:
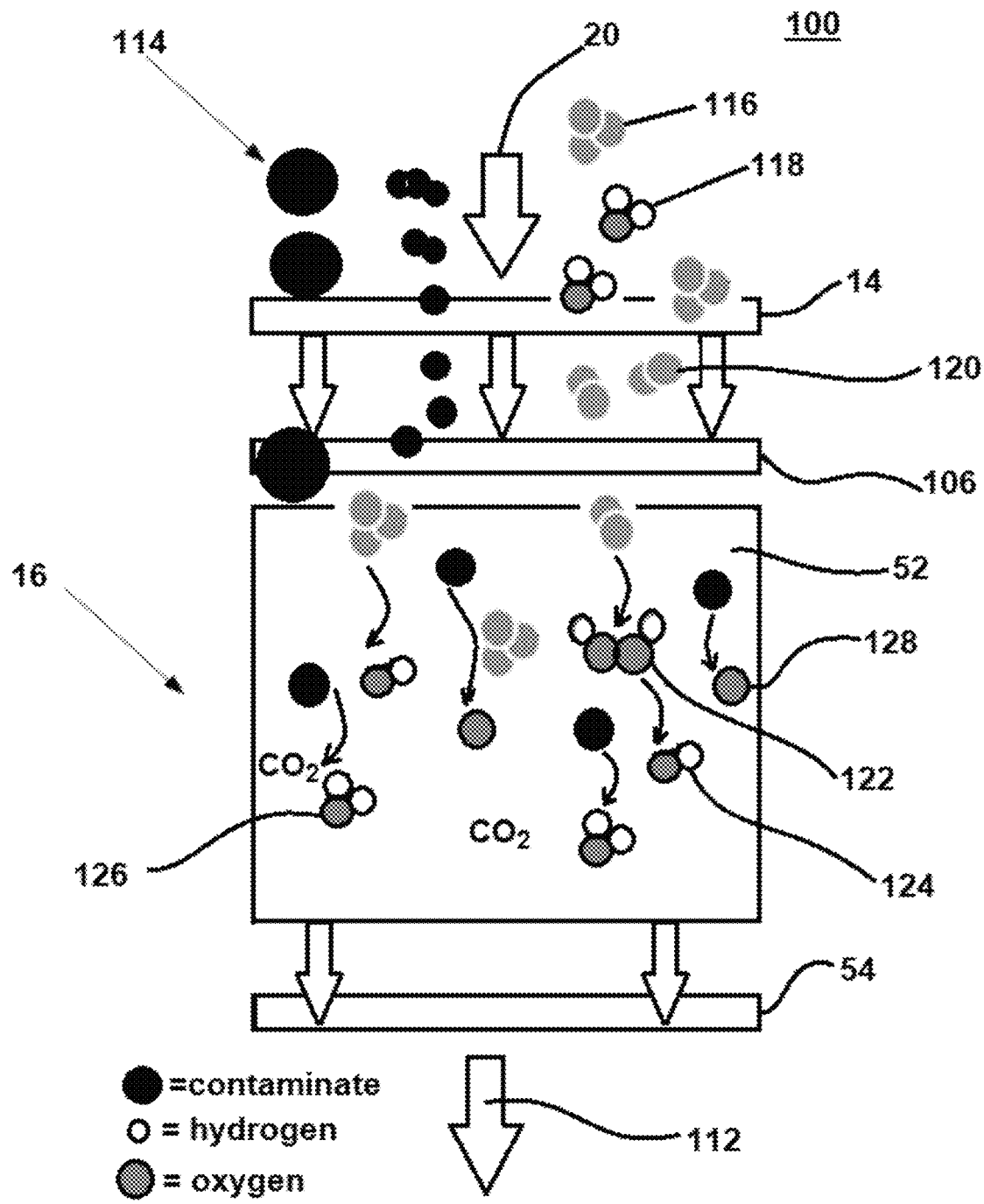
FIG. 5 is conceptual perspective view showing example electrochemical operation of the anode and cathode of the system shown in FIG. 1.

FIG. 5 is conceptual perspective view 100 showing electrochemical operation of the anode 14 and cathode 16 of the continuous flow system 10 shown in FIG. 1. As shown in FIG. 5, the system includes the anode 14, the PCM cathode 16 (including porous carbon material 52 and conductor 54), and a spacer 106 between the anode 14 and cathode 16 to prevent electrical contact between the anode 14 and cathode 16.

Figure 6:
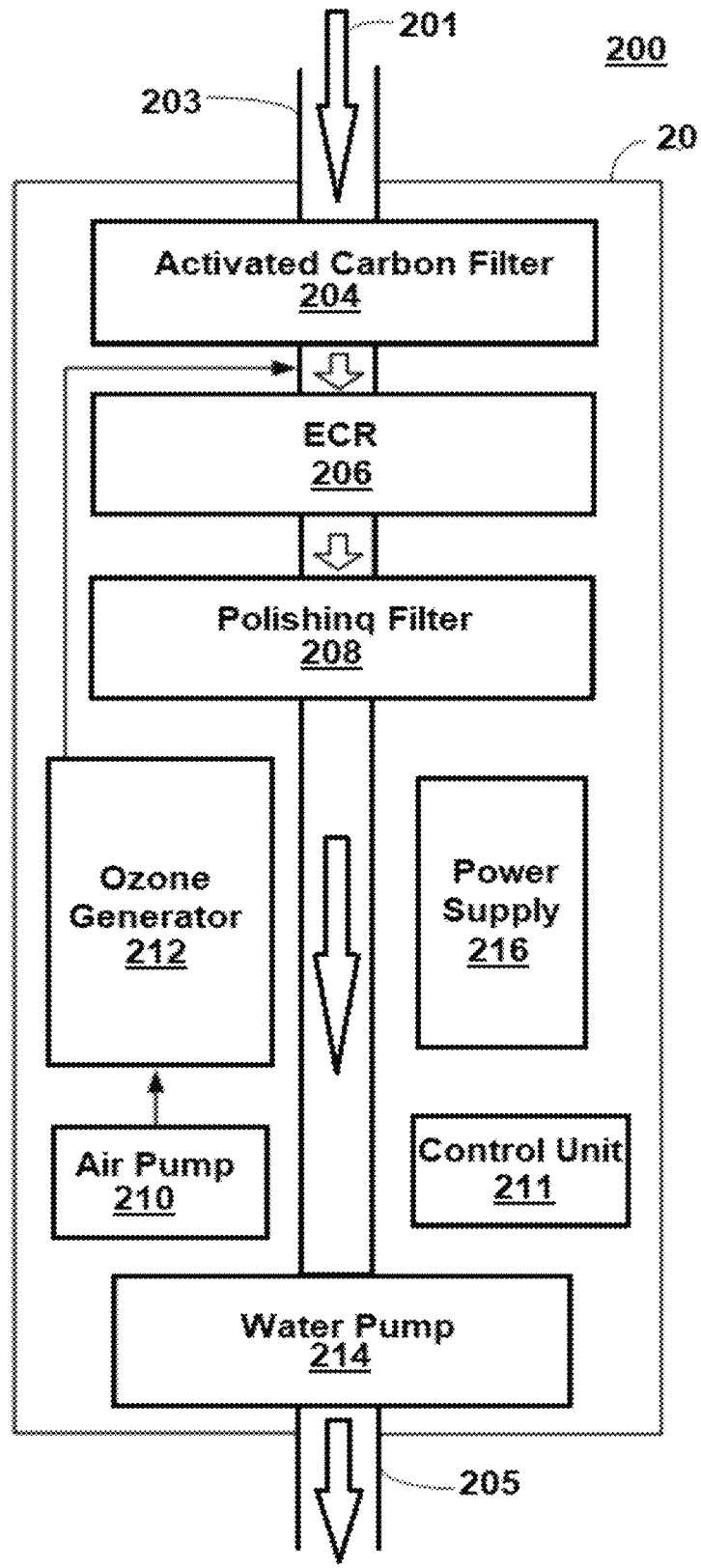
FIG. 6 is a schematic view showing an example modular water purification system including a disclosed porous carbon cathode.

The influent water 20 includes various contaminants 114, ozone 116, and water molecules 118. The ozone 116 may be pumped into the influent water 20 by an ozone generator (e.g., as shown in FIG. 6). As the water 20 passes through the anode 14, the electrochemical action of the anode 14 splits some of the water molecules to generate $O_2$ 120. The water 20, including the remaining contaminants 114, ozone 116, oxygen 120, and water molecules 118 then pass into the PCM 52 of the cathode 16.

Within the PCM 52, the electro-peroxone process occurs, with certain oxidation reactions taking place. For example, oxygen is converted to $H_2O_2$ 122. The hydrogen peroxide may then become hydroxyl radicals 124. The $H_2O_2$ 122 may react with contaminates 114 to degrade them into oxidized byproducts 128. Additionally, the ozone may oxidize contaminates into, for example, water 126 and $CO_2$.

The removal of chemical and biological contaminants occurs primarily inside the PCM 52. As the contaminated water flows through the PCM cathode 16, contaminants are adsorbed onto the material and gradually move through the PCM cathode 16 (similar to column separation, where the PCM serves as stationary phase, and water/wastewater serve as mobile phase). As the contaminants move down the PCM cathode 16, they are either mineralized into water and carbon dioxide or into lesser toxic species during the process.

Several advanced oxidation processes are occurring simultaneously inside the system 10. Most waterborne contaminants are rapidly oxidized into the lesser toxic form by ozonation ($O_3$). Persistent contaminants and intermediates of the ozonation are further oxidized by hydrogen peroxide ($H_2O_2$), which is generated from the reduction of water soluble oxygen ($O_2$) by the PCM cathode 16. In addition, hydrogen peroxide ($H_2O_2$) will react with ozone ($O_3$) directly to produce hydroxyl radicals (•OH) within the PCM 52, which may also oxidize persistent contaminants, intermediates of the ozonation, and disinfection byproducts generated from ozonation. Additional hydroxyl radicals (•OH) may be converted from the ozone ($O_3$) by the PCM 52.

Water soluble oxygen used by processes within the system may be supplied from two sources: 1) air-dissolved oxygen in the water influent that are not converted into ozone by an ozone generator; and 2) oxygen that are generated from water splitting at the anode 14, which is placed upstream of the cathode 16 inside the system 10.

Continuous removal of chemical and biological contaminants and constant availability of purified water is a significant feature of the system 10. This is achieved via the adsorption of contaminants inside the PCM 52, and the constant oxidation of these contaminants as they move down the PCM 52 by the various highly reactive species.

Reduced maintenance is another advantage of the PCM cathode 16. Because both biofouling and chemical fouling occurring in PCM cathode 16 are constantly removed by advanced oxidation processes, the PCM 52 is therefore constantly regenerated and cleansed during use. Additionally, since neither the PCM cathode 16 nor the anode 14 directly participate in the oxidation of contaminants, these electrodes 14, 16 are much lesser prone to degradation, which is a common drawback in some known electrochemical water/wastewater treatment systems.

After passing through the porous carbon material 52, the water passes though the porous conductor 54 and exits the system as treated water 112.

FIG. 6 is a schematic view showing an example modular water purification system 200 including a porous carbon cathode, such as cathode 16 illustrated in FIGS. 1-4. The system 200 includes an outer shell 202 having an inlet 203 for admitting untreated water influent 201 and an outlet 205 for releasing treated water. Contained within the outer shell 202 is an activated carbon filter 204, an electrochemical reactor (ECR) 206, a polishing filter 208, an air pump 210, an ozone generator 212, a water pump 214, a control unit 211, and a power supply 216.

The modular system 200 is a continuous reactor that combines physical adsorption, electrochemical oxidation, and filtration processes in series to achieve improved water purification. Water 201 flows into the inlet 203 and, in turn, passes through each stage of the purification process.

The first stage is the activated carbon filter 204, which may include granular activated carbon (GAC), powered activated carbon (PAC), biochar, any suitable combination of the aforementioned, or the like.

After the water passes through the activated carbon filter 204, it is received at the second stage, i.e., by the ECR 206, which performs one or more advanced oxidation processes (AOPs) involving the water. The ECR 206 may include the anode 14 and cathode 16 arranged as shown in FIGS. 1-4 to perform an electro-peroxone process involving the water. Ozone may be supplied to the ECR 206 by the ozone generator 212, which is supplied with air by the air pump 210.

Water exiting the ECR 206 is received by the third stage of the system 200. The third stage includes the polishing filter 208, which physically removes contaminants by size exclusion. The polishing filter 208 may include any suitable process or device for do this, such as a membrane, micro-filter, commercially-available micro-filter, any suitable combination of the foregoing, or the like.

The water pump 214 may be any suitable device for moving incoming water through the stages of the system 200. For example, the water pump 214 may be an electric centrifugal pump, positive displacement pump, peristaltic pump, or the like. The water pump 214 may be located elsewhere in the system 200 other than the location shown in FIG. 6.

The air pump 210 may be any suitable device for providing oxygen to the ozone generator 212, such as an air pump drawing air from the surrounding atmosphere. The air pump 210 may be an electric centrifugal pump, positive displacement pump, peristaltic pump, or the like. The air pump 210 may be located elsewhere in the system 200 other than the location shown in FIG. 6.

The ozone generator 212 may be a commercially-available ozone generator. For example, the ozone generator may be a corona discharge ozone generator.

The power supply 216 may be any suitable means for supplying electrical power to the control unit 211, air pump 210 and water pump 214, and supplying anodic current to the electrodes included in the ECR 206. For example, the power supply 216 may include a regulator and one or more rechargeable batteries, such as lithium or metal oxide batteries. The batteries may be recharged using a wall plug, or one or more solar panels. Alternatively, the power supply 216 may include an adapter for receiving electrical power directly from an external source, such as household outlets.

The control unit 211 is any suitable means for controlling the operation of the system 200. For example, the control unit 211 may control the voltage applied to the electrodes within the ECR 206 and the flow rate of both the air and water pumps, 210, 214. These operational parameters can be controlled to optimize the performance of the system 200 in terms of, for example, water purity or energy consumption. Accordingly, the control unit 211 can tune the operation of the system 200, including the in situ hydrogen peroxide production of the PCM cathode in the ECR 206, by adjusting the parameters, for example, by adjusting the air pump flow to increase ozone generation and the anodic potential at the PCM electrode.

The functions of the control unit 211 may be implemented in hardware, software, firmware, or any suitable combination thereof. If implemented in software, the functions may be stored as one or more instructions or code on a computer-readable medium (e.g., memory) and executed by a hardware-based processing unit (e.g., a processor). Computer-readable media may include any computer-readable storage media, including data storage media, which may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disc storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The control unit 211 may include one or more processors for executing instructions or code, such as one or more digital signal processors (DSPs), general purpose microprocessors, application specific integrated circuits (ASICs), field programmable logic arrays (FPGAs), or other equivalent integrated or discrete logic circuitry. The control unit 211 may also include memory. The memory and processor may be combined as a single chip.

The control unit 211 may optionally include a wireless interface, such as a Bluetooth interface, for communicating with one or more external digital devices, such as smartphones. In this configuration, an external device, such as a laptop computer or smartphone, may be programmed with an application to remotely send and receive data and/or control signals with the control unit 211 in order to control the operation of the system 200 by, for example, adjusting the operation parameters of anodic potential, air flow, and/or water flow.

The outer shell 202 may be made of any suitable material, such as plastic, and may have any suitable form factor and size. For example, it may be a compact, cylindrical container that may be easily carried by a person.

Figure 7:
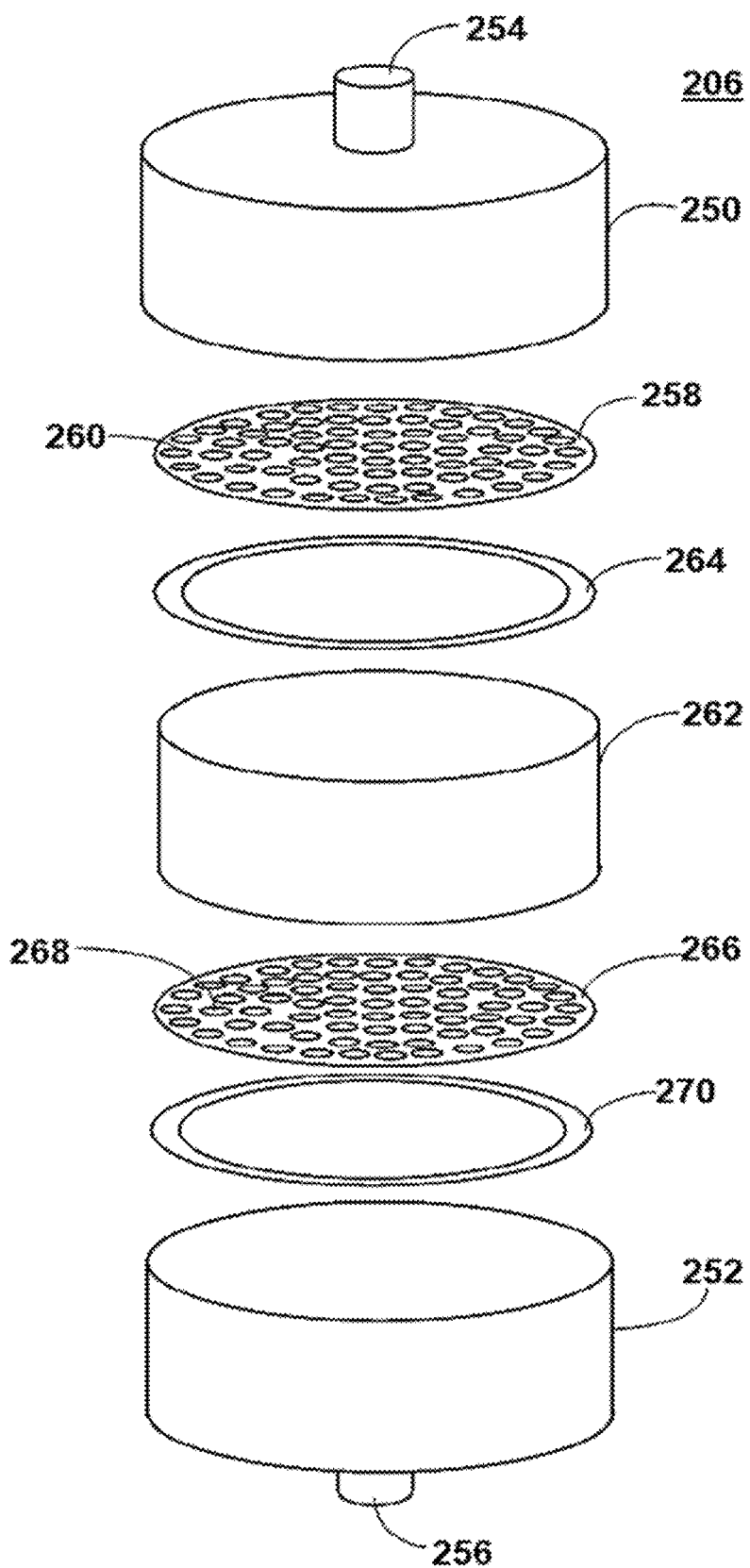
FIG. 7 is an exploded perspective view of an exemplary ECR module included in the modular system shown in FIG. 5.

Each of the stages may be self-contained in individual, modular, sealed shells with tubing between the stages permitting water flow. FIG. 7 shows an example of a self-contained shell for the ECR 206.

Other configurations of the system 200 are contemplated. For example, the three stages may be re-ordered relative to each other; or the internal components may be located at different places within the shell 202 other than the ones shown in FIG. 6. Additionally, one or more of the components 204-214 may be located externally outside the outer shell 202.

FIG. 7 is an exploded perspective view of an exemplary ECR module 206 included in the modular system 200 shown in FIG. 6. The ECR module 206 includes an outer shell have two mated shell halves 250, 252 configured to enclose the other components of the module 206. The top shell half 250 includes an inlet 254 for admitting water into the module 206, and the bottom shell half 252 includes an outlet 256 for releasing water that has passed through the ECR module 206.

Contained within the outer shell are an anode 258 having a plurality of holes 260 formed therein for passing water, a non-conductive spacer 264, a cathode including a puck 262 of porous carbon material and a conductor 266 in electrical contact with the puck 262, and a gasket 270.

The top and bottom shell halves 250, 252 may be made of any suitable plastic or other material. The shell halves 250, 252 may have mated threads so that the shell halves 250, 252 can be screwed together to form a water tight seal. The internal gasket 270 is provided to prevent leakage from the module 206 at the joint between the shell halves 250, 252.

The anode 258 may include any of the anode structures and materials described herein in connection with anode 14.

The cathode may include any of the cathode structures and materials described herein in connection with cathode 16.

Figure 8A:
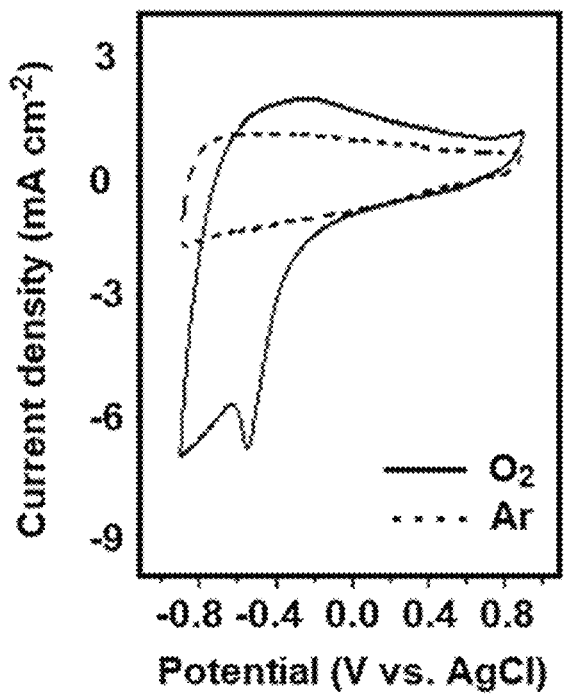
FIG. 8a-c are graphs showing experimental results for CV curves for an example disclosed PCM electrode.
Figure 8B:
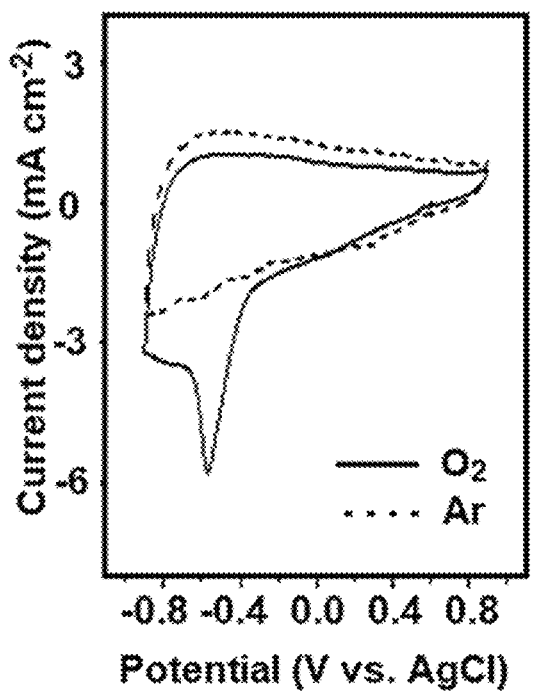
Figure 8C:
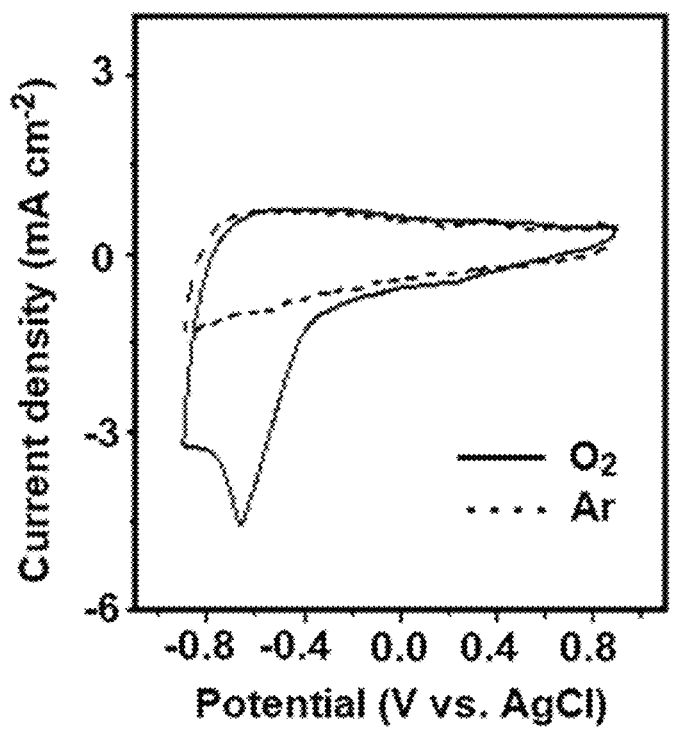

FIGS. 8a-c are graphs showing experimental results for cyclic voltammetry (CV) curves for an example disclosed electrode, namely, a PCM-HDA cathode. CV curves are shown for a PCM-HDA cathode in Ar (dash line) or $O_2$ (solid line) saturated solution with pH 4 (FIG. 8a), pH 7 (FIG. 8b), and pH 10 (FIG. 8c). Cyclic voltammetry of the PCM was examined in Ar or $O_2$ saturated solutions. As show in FIGS. 8a-c, well-defined reduction peaks can be observed for CV curves measured in $O_2$ saturated electrolytes, whereas quasi-rectangular voltammograms without any redox peaks were obtained in Ar-saturated solution. This indicates when used as cathode, the PCM 52 exhibits excellent electrocatalytic behavior of oxygen reduction. The peak potential of PCM-DAH for oxygen reduction is −0.51 V, −0.57 V, and −0.63 V for pH 4, 7, and 10, respectively. This is similar to those measured for PCM-EDA, PCM-TMA, PCM-TEA, and PCM-KOH. PCM-HDA presents the highest peak current density. These results suggest that PCM-HDA is more electrochemically active than other PCMs for oxygen reduction. Interestingly, the PCMs exhibited high activity at a wide spectrum of electrolyte pH, in which $H_2O_2$ can be produced at acidic, basic, as well as neutral conditions. This indicates that purification processes employing any of the disclosed PCM cathodes may be applied in a significantly greater variety of applications than carbon based cathodes that are commercially available.

Figure 9:
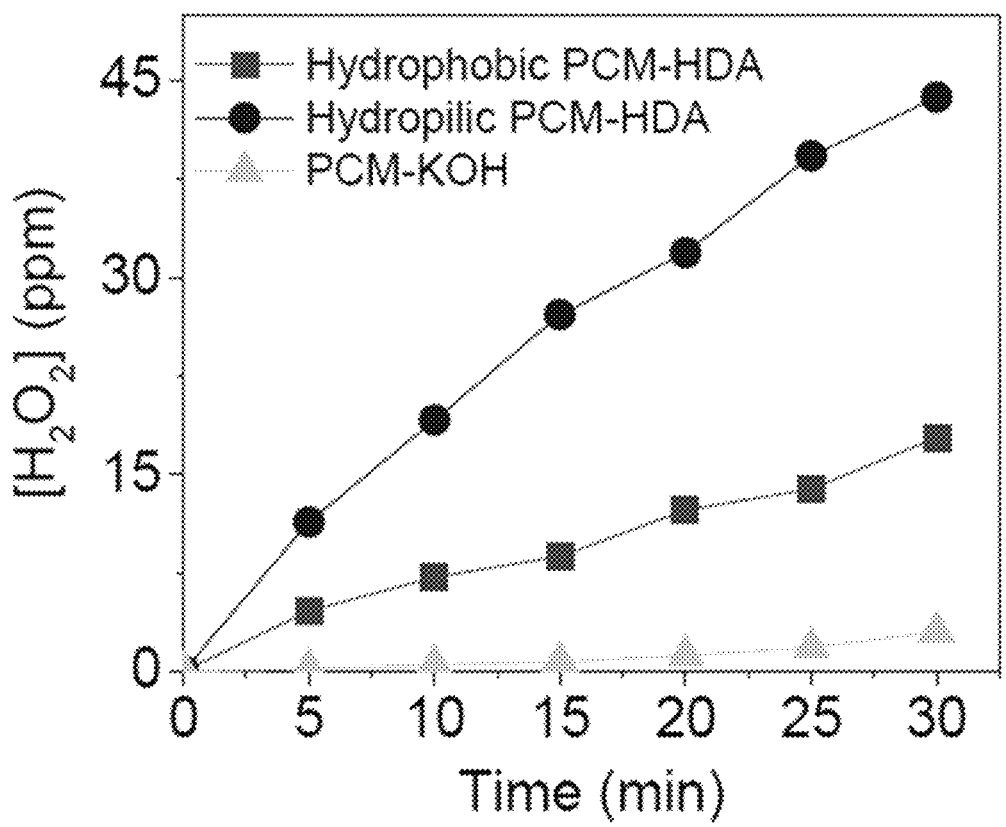
FIG. 9 is a graph showing experimental results of $H_2O_2$ generation using example disclosed porous carbon electrodes.

FIG. 9 is a graph showing experimental results of $H_2O_2$ generation using example disclosed porous carbon electrodes. In the graph, hydrogen peroxide productivity of a PCM cathode formed using hexamethylenediamine (PCM-HDA) is compared with a PCM cathode formed using KOH as the base. (PCM-KOH). The advantage of the unique pore structure within the PCM-HDA is clearly demonstrated.

Figure 10A:
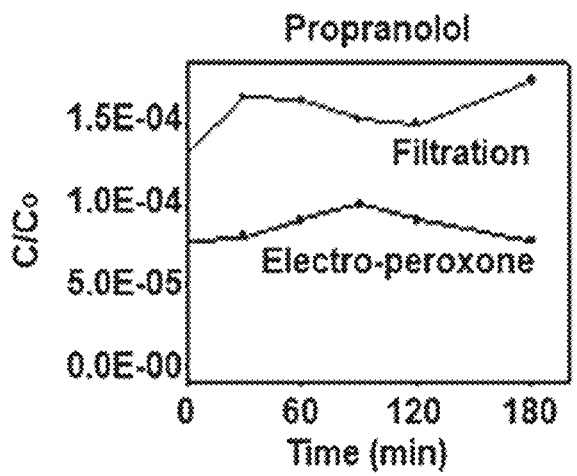
FIGS. 10a-f are graphs showing experimental results of pharmaceutical removal during wastewater treatment using an example disclosed porous carbon electrode.
Figure 10B:
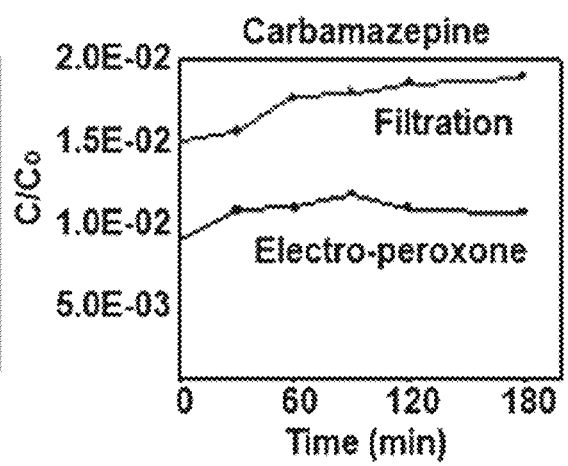
Figure 10C:
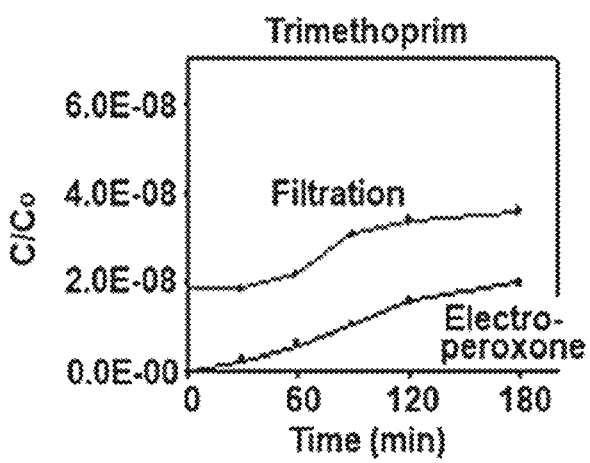
Figure 10D:
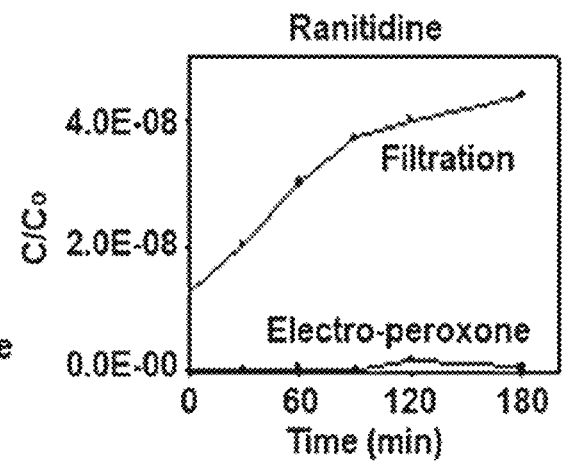
Figure 10E:
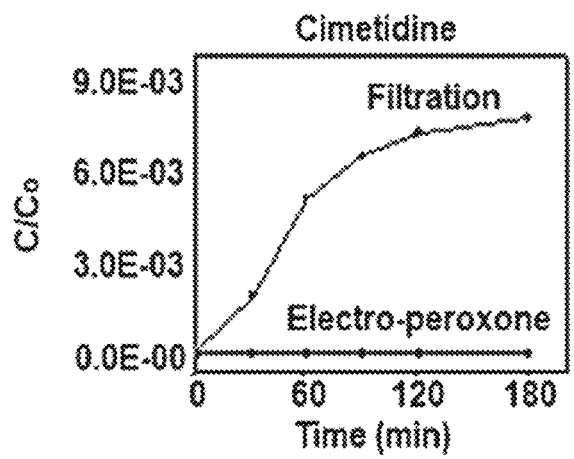
Figure 10F:
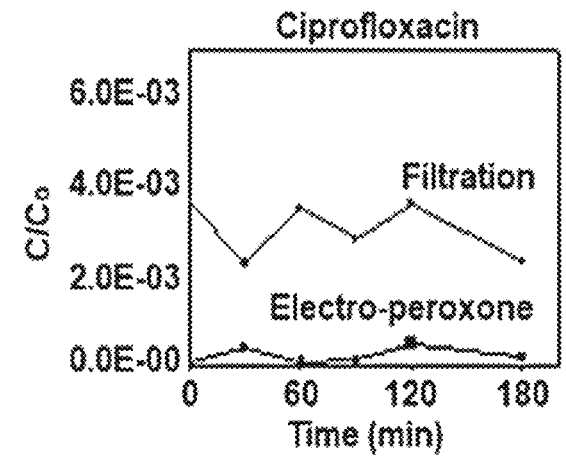

FIGS. 10a-f are graphs showing experimental results of pharmaceutical removal during continuous wastewater treatment using an example disclosed porous carbon electrode, namely a PCM-HDA cathode, in an electro-peroxone system. The testing was performed using stage 2 (an example flow-through ECR 206) of the system 200 shown in FIG. 6. FIG. 10a shows the experimental results for propranolol removal; FIG. 10b shows the experimental results for carbamazepine removal; FIG. 10c shows the experimental results for trimethoprim removal; FIG. 10d shows the experimental results for ranitidine removal; FIG. 10e shows the experimental results for cimetidine removal; and FIG. 10f shows the experimental results for ciprofloxacin removal. The figures show the treatment efficiency of using the PCM-HDA ECR to treat relatively high concentrations (800 nMol) of pharmaceuticals. The y-axis of each graph represents the ratio ($C/C_o$) of a presently measured concentration of the contaminant (C) to the starting concentration of the contaminant ($C_o$).

Figure 11:
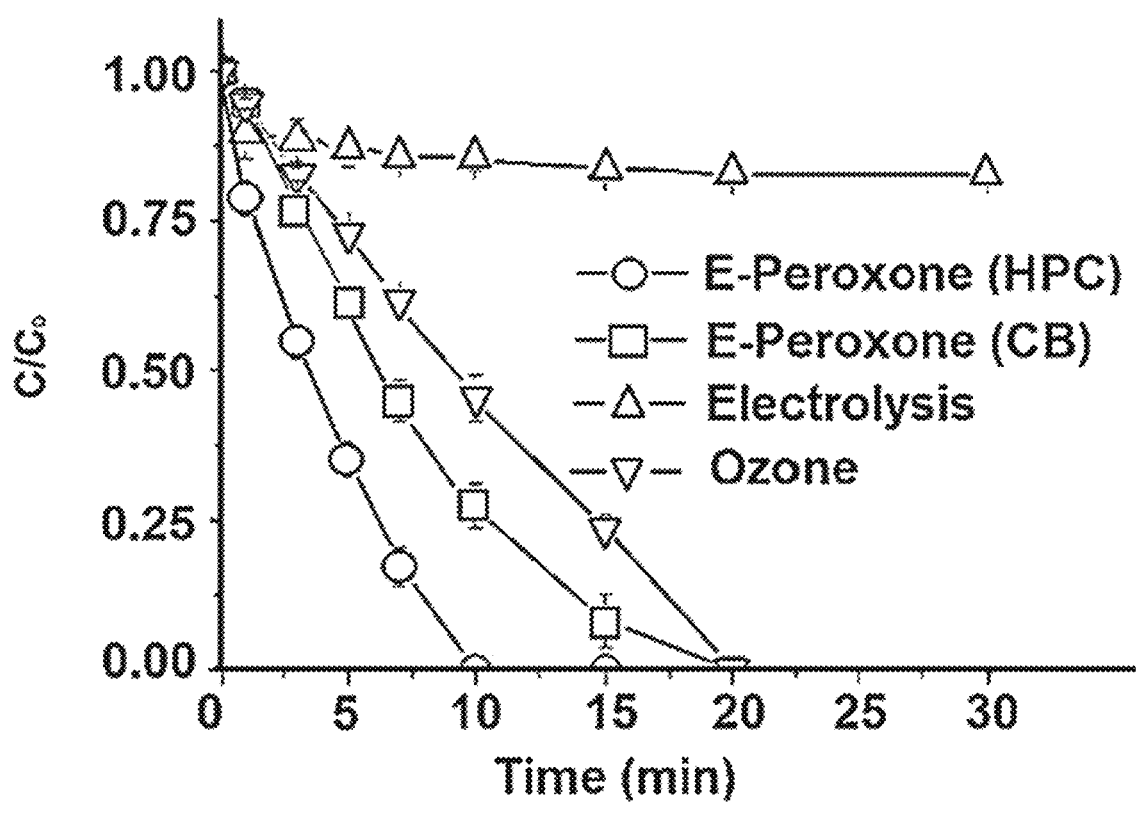
FIG. 11 is a graph comparing the experimental results of wastewater treatment using an example disclosed porous carbon electrode and other water purification techniques.

FIG. 11 is a graph comparing the experimental results of contaminant removal using an example disclosed porous carbon electrode (i.e., an example PCM-HDA cathode) and other known water purification techniques during continuous water treatment. The graph compares test results for an ozone process, electrolysis process, electro-peroxone (e-peroxone) process using conventional carbon bonded (CB) material as a cathode, and an e-peroxone process using a PCM-HDA cathode (HPC). The test results show that the disclosed PCM-HDA cathode performed significantly better than known systems.

Figure 12:
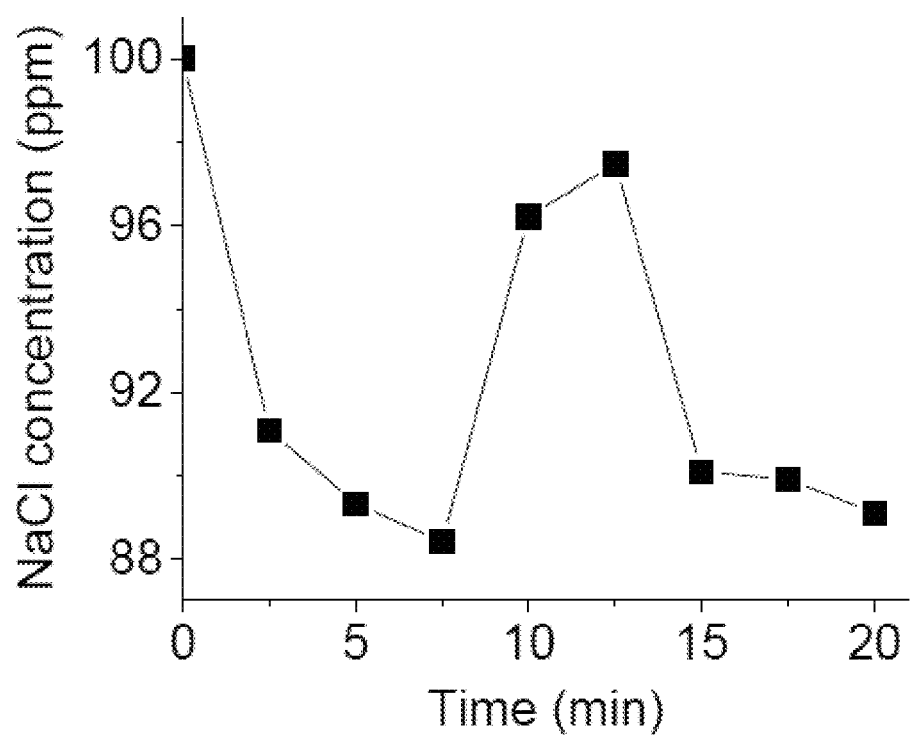
FIG. 12 is a graph showing experimental results of desalination using an example disclosed porous carbon electrode.

FIG. 12 is a graph showing experimental results of desalination using one or more disclosed porous carbon electrodes, for example, a pair of PCM-HDA electrodes. Any of the reactor systems disclosed herein can be modified to perform desalination. In general, the desalination process is based on capacitive deionization (CDI). For desalination, PCM electrodes are used as both the cathode and anode in the disclosed systems, a PCM electrode substituting for a metallic anode. The $Na^+$ and $Cl^-$ is electrosorbed onto the PCM electrodes (acting as both cathode and anode).

During desalination, regeneration of the system after a period of time may be performed to flush Na and Cl from the PCM electrodes. Because $Na^+$ and $Cl^-$ are electrosorbed onto the carbon monolith material, over time, adsorption equilibrium will be reached and therefore desalination efficiency may be reduced. The regeneration is achieved by temporarily switching the voltage polarity of PCM electrodes, i.e., the original cathode becomes the anode and the original anode becomes the cathode, so the electrosorbed $Na^+$ and $Cl^-$ will be desorbed and flushed away, allowing desalination to proceed. Also, for desalination, no air/ozone is required, and thus, no ozone generator and air pump are necessary.

The test results shown in the graph of FIG. 12 are for a system using small PCM electrodes (each a 0.6" diameter, 0.4" height cylinder). As shown in the graph, the PCM electrode system is capable of continuously removing about 10 ppm of NaCl (as shown in the graph between about 3 to 7 minutes and 15 to 20 minutes, which is roughly the concentration of brackish water (0.5-30 ppm NaCl) from water. A breakthrough in the electrosorbsion of $Na^+$ and $Cl^-$ occurs between about 9 and 13 minutes of operation, as shown in the graph by the peaking of NaCl concentration in the water. At this point, a regeneration cycle occurs, causing the removal efficiency to be restored, as shown at the period of 15 to 20 minutes in the graph.

The test conditions were a flow rate of 10 mL/minute, a potential of 6 volts being applied between the electrodes during desalination, and a potential of −6 volts being applied between the electrodes during desalination. The starting concentration of NaCl in the water was 100 ppm.

The disclosed electrochemical reactor may be employed in solar powered toilets and waste treatment systems, for example, those disclosed in U.S. Published Patent Application 2014/0209479, which is incorporated by reference herein in its entirety. For example, the voltage source 18 of FIG. 1 or power supply 216 of FIG. 6 herein may be a photovoltaic source, and the electrochemical processing can be done on human waste.

The foregoing description is illustrative and not restrictive. Although certain exemplary embodiments have been described, other embodiments, combinations and modifications involving the invention will occur readily to those of ordinary skill in the art in view of the foregoing teachings. Therefore, this invention is to be limited only by the following claims, which cover one or more of the disclosed embodiments, as well as all other such embodiments and modifications when viewed in conjunction with the above specification and accompanying drawings.

What is claimed is:

1. A water treatment system using an electro-peroxone process, comprising:
   an activated carbon filter receiving influent water;
   an electrochemical reactor (ECR) receiving water output from the activated carbon filter, including:
      an anode having a plurality of openings configured to allow the water output from the activated carbon filter to flow through the anode;

a flow-through cathode, receiving water output from the anode, the cathode including a porous carbon material configured to admit flowing water to be de-contaminated by an electro-peroxone process performed within the porous carbon material, the porous carbon material including a carbonized, organic-amine-base-catalyzed, porous resorcinol-formaldehyde (RF) polymer, wherein the porous carbon material is synthesized by:
  providing a solution consisting of resorcinol and a surfactant in a mixture of ethanol and water;
  adding formaldehyde to the solution;
  adding an organic-amine base, as a catalyst, to the solution to form a solution mixture;
  heating the solution mixture to produce a solidified material;
  drying the solidified material; and
  performing pyrolysis on the dried solidified material under a protective gas, resulting in the porous carbon material;
the porous carbon material configured to receive oxygen from an oxygen source and configured to receive ozone from an ozone generator;
wherein the cathode is configured to electro-generate $H_2O_2$ and perform the electro-peroxone process in situ within the porous carbon material using the received oxygen and the received ozone, the received ozone and the electro-generated $H_2O_2$ for purifying the flowing water as the water flows through the porous carbon material;
a non-conductive spacer located between the anode and the cathode to prevent electrical contact between the anode and the cathode; and
an electrical conductor contacting the porous carbon material, the electrical conductor having a plurality of openings configured to allow the water to flow through the cathode; and
the ozone generator configured to introduce ozone into water flowing into the ECR.

2. The system of claim 1, wherein the system is portable.

3. The system of claim 2, further comprising a voltage source connected to the anode and the cathode.

4. The system of claim 3, further comprising a polishing filter, receiving water output from the ECR, configured to remove contaminants from the water flow by size exclusion.

5. The system of claim 4, further comprising a water pump for moving water through the activated carbon filter, the ECR and the polishing filter.

6. The system of claim 5, further comprising a housing configured for continuous flow of the water therethrough and configured to contain the activated carbon filter, the ECR, the voltage source, the polishing filter, the water pump, and the ozone generator.

7. The system of claim 6, further comprising a control unit located in the housing, the control unit for adjusting ozone generation of the ozone generator, water flow rate of the water pump, and voltage applied by the voltage source to the anode and the cathode.

8. The system of claim 7, further comprising:
an air pump, contained in the housing and operatively coupled to the ozone generator, for supplying air to the ozone generator.

9. A flow-through electrode for water purification using an electro-peroxone process, comprising:
  a porous carbon material configured to admit flowing water to be de-contaminated within the porous carbon material, the porous carbon material comprising a carbonized, organic-amine-base-catalyzed, porous resorcinol-formaldehyde (RF) polymer, wherein the porous carbon material is synthesized by:
  providing a solution consisting of resorcinol and a surfactant in a mixture of ethanol and water;
  adding formaldehyde to the solution;
  adding an organic-amine base, as a catalyst, to the solution to form a solution mixture;
  heating the solution mixture to produce a solidified material;
  drying the solidified material; and
  performing pyrolysis on the dried solidified material under a protective gas, resulting in the porous carbon material;
the porous carbon material configured to receive oxygen from an oxygen source and configured to receive ozone from an ozone generator;
wherein the electrode is configured to electro-generate $H_2O_2$ and perform the electro-peroxone process in situ within the porous carbon material using the received oxygen and the received ozone, the received ozone and the electro-generated $H_2O_2$ for purifying the flowing water as the water flows through the porous carbon material.

10. The electrode of claim 9, wherein the organic-amine-base catalyst is selected from the group consisting of 1,6-diaminohexane, ethylenediamine (EDA), trimethylamine (TMA), and triethylamine (TEA).

11. The electrode of claim 9, wherein the surfactant is poloxamer 407.

12. The electrode of claim 9, wherein the protective gas is selected from the group consisting of nitrogen, hydrogen and an inert gas.

13. The electrode of claim 9, wherein a porosity of the porous carbon material is tuned by adjusting a polymerization process used to form the porous carbon material.

14. The electrode of claim 9, wherein the porous carbon material is formed into a predetermined three-dimensional object.

15. The electrode of claim 9, wherein the porous carbon material has a structure that provides a reaction surface area of 200-800 $m^2/g$.

16. The electrode of claim 9, further comprising a metallic conductor in electrical contact with the porous carbon material.

17. The electrode of claim 9, wherein the porous carbon material lacks a binding agent.

* * * * *